(12) United States Patent
Keller et al.

(10) Patent No.: US 8,296,442 B2
(45) Date of Patent: Oct. 23, 2012

(54) METHOD AND APPARATUS FOR MINIMIZING BANDWIDTH USAGE BETWEEN A COMMUNICATION SERVER AND MEDIA DEVICE

(75) Inventors: Matthew C. Keller, Algonquin, IL (US);
Peter M. Drozt, Prairie Grove, IL (US);
Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 322 days.

(21) Appl. No.: 12/621,115

(22) Filed: Nov. 18, 2009

(65) Prior Publication Data

US 2011/0119387 A1    May 19, 2011

(51) Int. Cl.
G06F 15/16 (2006.01)
G06F 3/01 (2006.01)

(52) U.S. Cl. ........ 709/227; 709/232; 370/230; 370/477; 715/755

(58) Field of Classification Search ............... 715/755; 709/232; 370/230, 231, 477
See application file for complete search history.

(56) References Cited

U.S. PATENT DOCUMENTS

| | | | |
|---|---|---|---|
| 7,366,780 B2 | 4/2008 | Keller | |
| 7,751,348 B2 * | 7/2010 | Shaffer et al. | 370/260 |
| 7,965,659 B1 * | 6/2011 | Doran | 370/260 |
| 8,077,634 B2 * | 12/2011 | Maggenti et al. | 370/260 |
| 2002/0035602 A1 * | 3/2002 | Garcia-Luna-Aceves et al. | 709/204 |
| 2002/0099829 A1 * | 7/2002 | Richards et al. | 709/227 |
| 2004/0174830 A1 * | 9/2004 | Koskelainen et al. | 370/260 |
| 2005/0105511 A1 * | 5/2005 | Poikselka | 370/352 |
| 2006/0229093 A1 * | 10/2006 | Bhutiani et al. | 455/518 |
| 2007/0124492 A1 * | 5/2007 | Liao et al. | 709/231 |
| 2007/0185989 A1 | 8/2007 | Corbett | |
| 2008/0043744 A1 * | 2/2008 | Keller et al. | 370/395.2 |
| 2008/0168172 A1 * | 7/2008 | Keller et al. | 709/227 |
| 2008/0320083 A1 * | 12/2008 | Albertsson et al. | 709/205 |
| 2009/0154658 A1 * | 6/2009 | Kasper et al. | 379/32.01 |
| 2010/0257461 A1 * | 10/2010 | Brewer et al. | 715/755 |

FOREIGN PATENT DOCUMENTS

WO   WO03069946 A1   8/2003
WO   2007018694 A1   2/2007

OTHER PUBLICATIONS

PCT International Search Report Dated Dec. 22, 2010.

* cited by examiner

Primary Examiner — Wing Chan
Assistant Examiner — Kostas Katsikis
(74) Attorney, Agent, or Firm — Valerie M. Davis; Kenneth A. Haas

(57) ABSTRACT

A communication server implements a method that minimizes bandwidth usage between a media device and the communication server in a communication system where separate session and floor control protocols are used. Where multiple clients have established separate sessions to access a media source at a media device and upon determining that the multiple clients are attempting to access the same media source, the communication server implements floor control logic to tie multiple floor arbiters together across the separate sessions to cause a single media stream to be sent from the media source and received at the communication server for distribution to the clients, thereby minimizing the bandwidth on the uplink between the media device and the communication server.

15 Claims, 4 Drawing Sheets

METHOD AND APPARATUS FOR MINIMIZING BANDWIDTH USAGE BETWEEN A COMMUNICATION SERVER AND MEDIA DEVICE

FIELD OF INVENTION

The present invention generally relates to remote data sharing and in particular relates to a method and apparatus for reducing bandwidth when sending media between a media device and a communication server, for ultimate delivery to client devices.

BACKGROUND

With advancements in the field of telecommunications today, it is quite easy to communicate media remotely over a network from a media device that includes one or more media sources such as cameras, recorders, media files, and the like, to interested parties. For example, public safety agencies are increasingly equipping public safety vehicles with cameras and digital recorders to capture activities in and around the vehicle; and video cameras (such as Internet Protocol (IP) cameras mounted on tripods and connected to a wireless transceiver) are increasingly being deployed at emergency scenes. Using wireless broadband systems, designated officials (such as dispatchers or incident commanders) can, for instance, have a remote view of a situation from one or more mobile cameras to make faster and more effective decisions to handle the situation.

In this and other similar situations, multiple clients may wish to simultaneously access the same media source. However, there are shortcomings associated with the known solutions that enable multiple clients to simultaneously access a media source. The following described solutions apply to video sources such as cameras but could apply to other types of media sources. In accordance with a first solution, each viewer of the video establishes an independent viewing session with a media device that contains a camera; for instance, each user wishing to view the video, separately pulls up a web page and accesses the video from the camera via controls issued through a web server on the camera. When configured for unicast operation, the camera sources an independent video stream to each of the viewers resulting in multiple copies of the video being sent on an uplink connection between the camera and the web server. This ultimately limits the number of users that can view the video at the same time, which in the event of an emergency can be a critical limitation.

Some cameras also support multicast operation, which results in a single copy of the video being simultaneously multicast from a communication server to all clients having joined the multicast group. However, many wireless networks do not support multicast or, if they do, they do not support IETF (Internet Engineering Task Force) standard multicast. In addition, multicast suffers from reliability problems when used on a wireless downlink between the communication server and the users' devices because there is no feedback or retry mechanism to deal with lost packets. Also, users need to be informed of the particular multicast groups that need to be joined; and changing the media source requires changing a multicast group.

Another existing solution is to set up a group call every time there are multiple users involved. This can be problematic since the users need to know beforehand that they wish to share the uplink connection with other users, and accordingly, set up a group call. Additionally, it means that the media source has to be joined to all groups (requiring an explicit affiliation step) in order to be able to participate in these group sessions. This approach is not very flexible since it: requires the users' coordination; makes it difficult to change media sources; and can lead to scalability and performance problems. Similarly, in video conferencing, a multi-point controller is used to distribute sourced video to conference participants. However, this also requires pre-arranged conference calls that all participants must explicitly join.

Yet another existing solution is a chat model, wherein there is a chat session per camera, and clients join the chat session to view the video of a particular camera. This approach creates a lot of session signaling overhead since each camera requires a different chat session, and a user desiring to switch between cameras has to signal to leave the session with the first camera and then signal to join the session with the second camera. This can result in significant delays when switching between cameras as the new session is established, which can result in a poor user experience as Quality of Service (QoS) is re-established after each camera switch. This approach also creates a large amount of overhead in the communication server since a chat session must exist for every media source in the system (potentially thousands). In addition, this model does not work well when a media device has more media sources than its ability to stream from those sources because the policy for selecting which clients would be allocated access to the limited resources has to be applied across sessions and might, therefore, result in a cascade of re-INVITES as preemption occurs.

Therefore, it is desirable to have a solution that makes efficient use of the network resources when multiple clients access the same media source, without requiring clients to coordinate their sessions.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
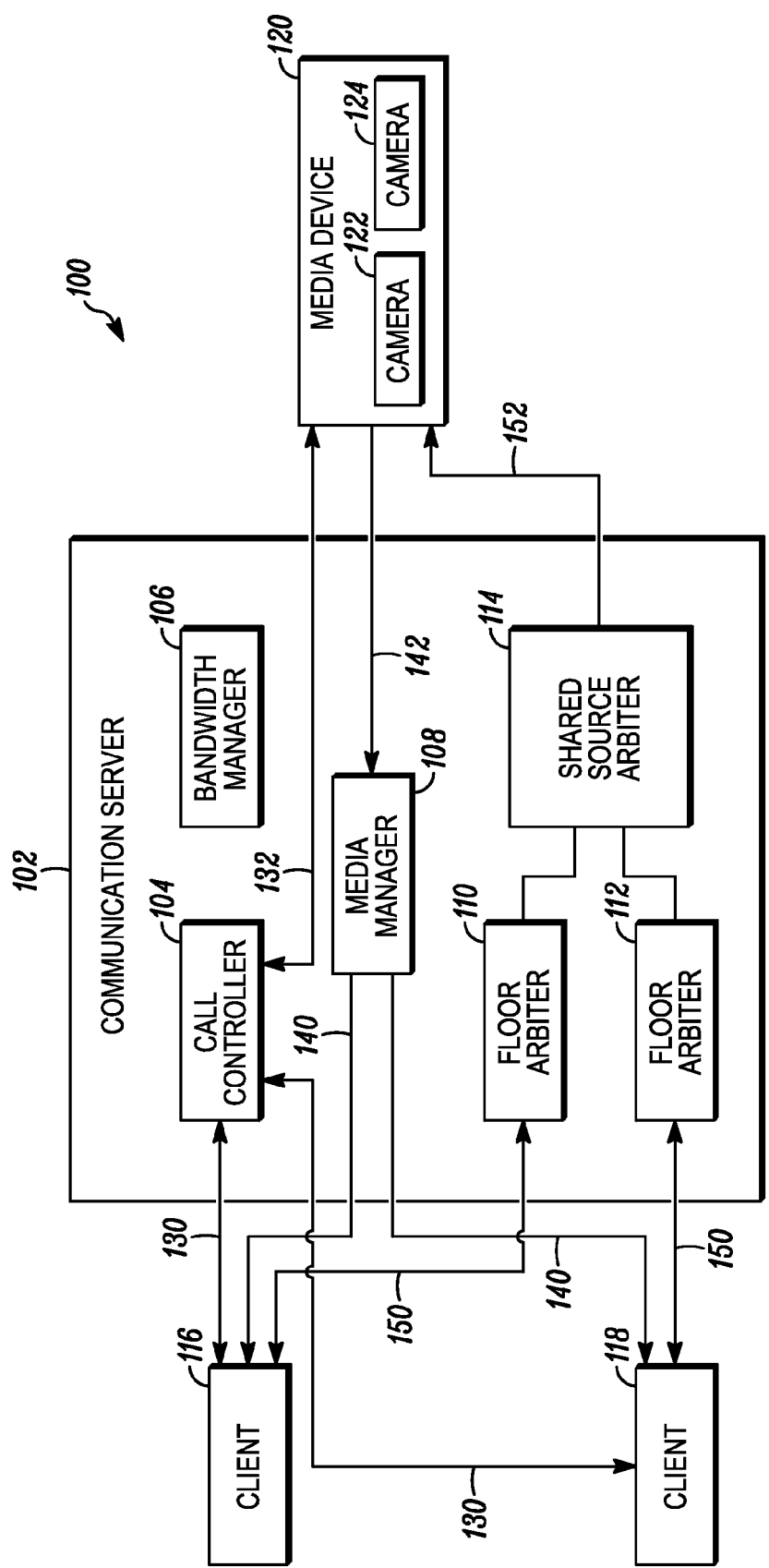
FIG. 1 is a block diagram illustrating a system in which multiple clients access media from a media device via a communication server in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments, a method is provided for implementing in a communication server, which minimizes bandwidth usage between a media device and the communication server in a communication system where separate session and floor control protocols are used. Where multiple clients have established separate sessions to access a media source at a media device and upon determining that the multiple clients are attempting to access the same media source, the communication server implements novel floor control logic to tie multiple floor arbiters together across the separate sessions to cause a single media stream to be sent from the media source and received at the communication server for distribution to the clients, thereby minimizing bandwidth on the uplink between the media device and the communication server.

This solution maintains independent session signaling and floor control signaling between the clients and the communication server (and is therefore transparent to the clients), thereby providing efficiencies on the uplink like those provided by a group call but without requiring the clients' explicit use of group call semantics and signaling. Moreover, the communication server further uses the novel floor control logic to switch between media sources, which is much more efficient (both in terms of the number and size of the messages exchanged as well as in terms of the setting of QoS) than using session control signaling as is done in the known techniques. Those skilled in the art will realize that the above recognized advantages and other advantages described herein are merely illustrative and are not meant to be a complete rendering of all of the advantages of the various embodiments.

Referring now to the figures, FIG. 1 illustrates a communication system 100, which includes a communication server 102, clients 116 and 118, and a media device 120 that includes two media sources 122 and 124, which in this illustrative implementation are cameras. Those skilled in the art will recognize and appreciate that the specifics of the examples in this detailed description are merely illustrative of some embodiments and that the teachings set forth herein are applicable in a variety of alternative settings. For example, the system may include more clients, communication servers, media devices, and media sources than what is shown in FIG. 1.

Moreover, the teachings herein are applicable to any communication system where separate session and floor control protocols are used. A specific embodiment is described by reference to FIG. 3 and FIG. 4, wherein the system elements (e.g., clients, communication server, and media device) operate in compliance with OMA (Open Mobile Alliance) PoC (Push-to-talk over Cellular) standards as set forth in, for example, OMA-TS-PoC_ControlPlane-V2_0-20090922-C, OMA-TS-PoC UserPlane-V2_0-20090922-C and OMA-RD-PoC-V2_0-20090922-C. These standards documents describe the use of Session Initiation Protocol (SIP) as set forth in IETF Request for Comments (RFC) 3261 (June 2002) as the session control protocol used to establish SIP sessions and further describe a separate Media Burst (formally Talk Burst) Control Protocol (that is based on IETF RFC 3550 (July 2003)) as the floor control protocol used to determine (also referred to in the art as "arbitrate") which entities send and receive media during active SIP sessions. In another implementation, the system elements utilize a Framework for Centralized Conferencing as set forth in draft-ietf-xcon-framework-11 (Apr. 11, 2008), which describes a Binary Floor Control Protocol as set forth in IETF RFC 4582 (November 2006) as the floor control protocol and describes the use of various session control protocols such as, SIP, H.323, Jabber, Q.931, or ISUP.

The communication server 102, media device 120, and clients 116 and 118 are all communicatively coupled over one or more communication networks (not shown) for exchanging message signaling to set up, modify, and terminate media sessions (such as SIP sessions) and to effectuate floor control signaling in accordance with the teachings herein. The communication network(s) can be a wired network, a wireless network, or a network enabling both wired and wireless communications and usually includes a number of network infrastructure devices such as, but not limited to, bridges, switches, zone controllers, base station controllers, repeaters, base radios, base stations, base transceiver stations, access points, routers or any other type of infrastructure equipment interfacing any entity in a wireless or wired environment.

Turning first to the communication server 102, this element contains all of the necessary hardware and software for carrying out its functionality, including those functions illustrated by reference to the flow diagrams shown in FIG. 2 to FIG. 4. In general, although not shown, the communication server 102 comprises a memory, one or more network interfaces, and a processing device (or processor) operatively coupled for performing its functionality. Moreover, although, the communication server is illustrated as a single entity, its functionality may be housed in a single physical unit or spread across multiple physical units. Moreover, the functionality may be allocated to one or more infrastructure devices in support of a client-server model or in one or more client devices in support of a peer-to-peer architecture, or a combination thereof.

Communication server 102 includes, as functional or logical blocks, a call controller 104, a bandwidth manager 106, and a media manager 108, whose functionality is provided using the processing device of the communication server. The call controller 104 manages the establishing, modification, and termination of media sessions using session control signaling 130 and 132, which have the clients 116, 118 and the media device 120 as participants. The media manager 108 distributes media 140 to the clients that is sourced 142 from the media device. The bandwidth manager 106 manages the amount of bandwidth needed to receive the media flows 142 from the media device.

Additionally, upon receiving requests for media sources, respectively from clients 116 and 118, communication server 102 generates floor arbiters 110 and 112, and also generates a shared source arbiter 114 that uses floor control signaling 152 in accordance with the teachings herein. Floor arbiters 110 and 112 exchange standard floor control signaling 150, respectively, with clients 116 and 118 to arbitrate which media is sent to these clients. The novel shared source arbiter 114 ties together the individual floor arbiters 110 and 112 and exchanges the floor control signaling 152 with the media device 120 to enable a reduction of bandwidth usage on the uplink between the media device 120 and the communication server 102 by establishing a single media stream for sourcing media when multiple clients request access to the same media source. The functionality of the arbiters 110, 112, and 114 is provided using the processing device of the communication server 102.

The processing device in the communication server 102 can be implemented via programmed logic or code; and/or the processing device may be implemented as a state machine or ASIC. The memory in the communication server 102 can include short-term and/or long-term storage of various data needed for the functioning of the communication server 102 and may further store software or firmware for programming the processing device with the logic or code needed to perform its functionality. For example, the memory 116 can be implemented as any suitable volatile and/or static memory component(s) for facilitating short-term and/or long-term storage of various data.

The implementation of the network interfaces of the communication server 102 depends on the particular type of network, i.e., wired and/or wireless, to which the communication server 102 is connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed in the processing device of the communication server 102 through programmed logic such as software applications or firmware stored on the memory device of the communication server 102.

The clients 116 and 118 are user devices that include the hardware and software needed for performing their functionality as relates to the teachings herein. Clients 116 and 118 are also referred to in the art as communication devices, client entities, client devices, access devices, access terminals, user equipment, mobile stations, mobile subscriber units, mobile devices, and the like, and can be any standard communication device such as radios, mobile phones, Smartphones, Personal Digital Assistants (PDAs), laptops, two-way radios, cell phones, and any other device capable of operating in a wired or wireless environment. Each client includes (although not shown) a memory, one or more network interfaces, and a processing device that are operatively coupled. The memory, network interface(s), and processing device can be implemented using any suitable conventional elements.

The media device 120 contains hardware and software needed for sourcing media (e.g., audio, video, text, etc.) from one or more media sources, including, but not limited to, a network interface, a processing device, a codec, memory, and the one or more media sources, all operatively coupled. The network interface, processing device, codec and memory can be implemented using any suitable conventional elements. Moreover, although cameras are the illustrated media sources in FIG. 1, the media device 120 can contain any type of media source (e.g., files, recorders, etc) that provides any type of media either real-time or pre-stored, examples of which include, audio, video, still image, text (formatted and non-formatted), file, multimedia, etc.

Definitions for some of the terms used herein will assist in understanding the disclosed teachings. For instance, a session control protocol (also referred to herein as session control signaling) is defined as signaling (i.e., sets of message sequences) for establishing, modifying, and terminating a session between endpoints for exchanging media, wherein a session or media session is defined as a relationship between endpoints that persists for some amount of time for purposes of communicating. An example session control protocol is the SIP protocol, which defines signaling to establish, modify, and tear down a SIP session. A floor control protocol (also referred to herein as floor control signaling) is defined as signaling (i.e., sets of message sequences) to arbitrate or control permissions to source and receive media during an active session. In accordance with the teachings herein, the session control protocol and the floor control protocol are different protocols.

An uplink is defined as a logical connection between a media device and the communication server that may include one physical connection or multiple physical connections used in the aggregate. A media stream is defined as a logical connection between the media device and the communication server for sourcing media from a single media source over a single uplink connection. A media stream is characterized by a set of parameters such as, for instance, media details, transport addresses, and other media related metadata. In one illustrative example, media stream parameters (also referred to herein as a media stream descriptor) are defined using Session Description Protocol (SDP) as described in RFC 4566 (July 2006).

Figure 2:
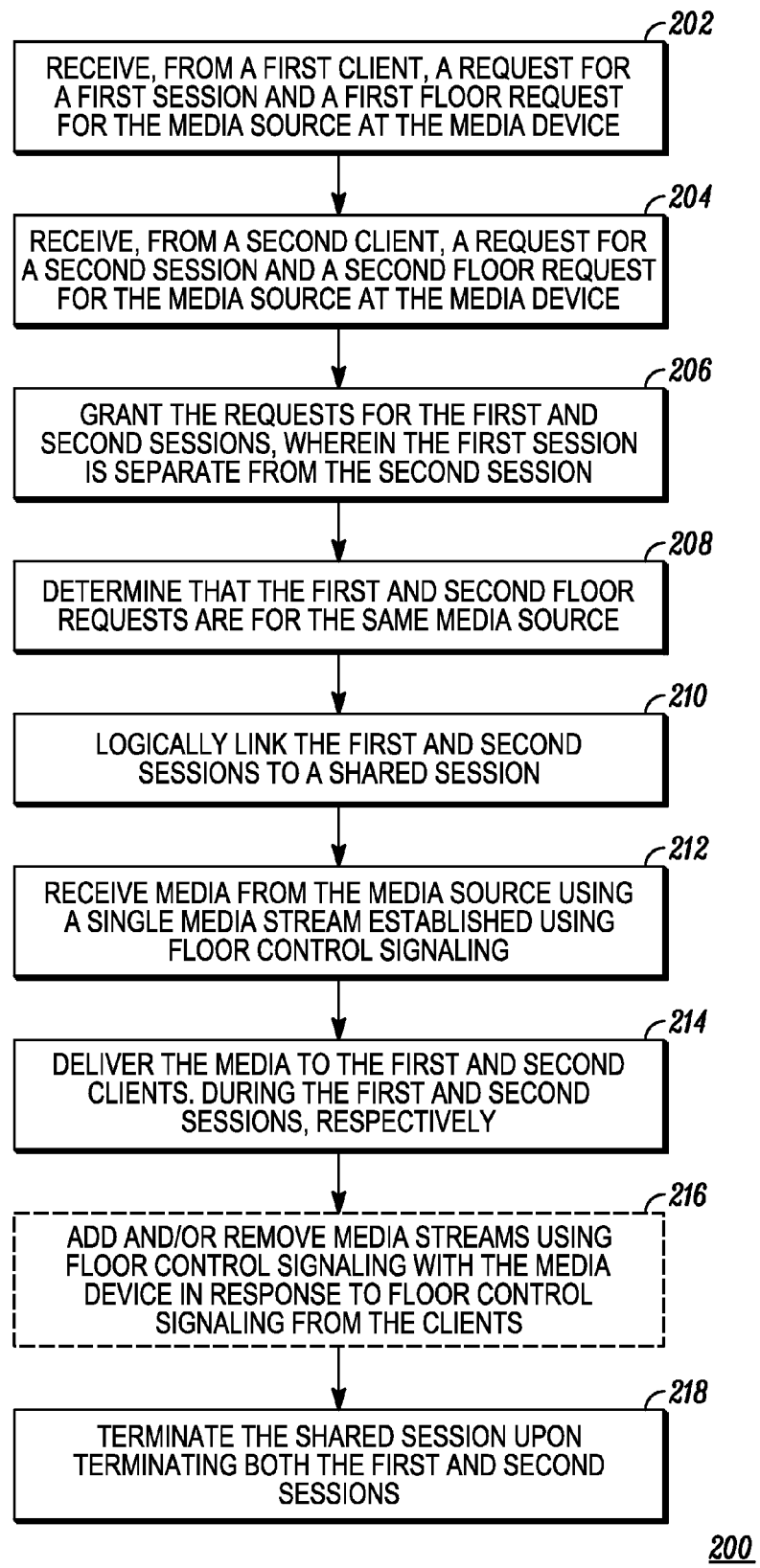
FIG. 2 is a flow diagram of a method for minimizing bandwidth usage between a communication server and a media device in accordance with some embodiments.
Figure 3:
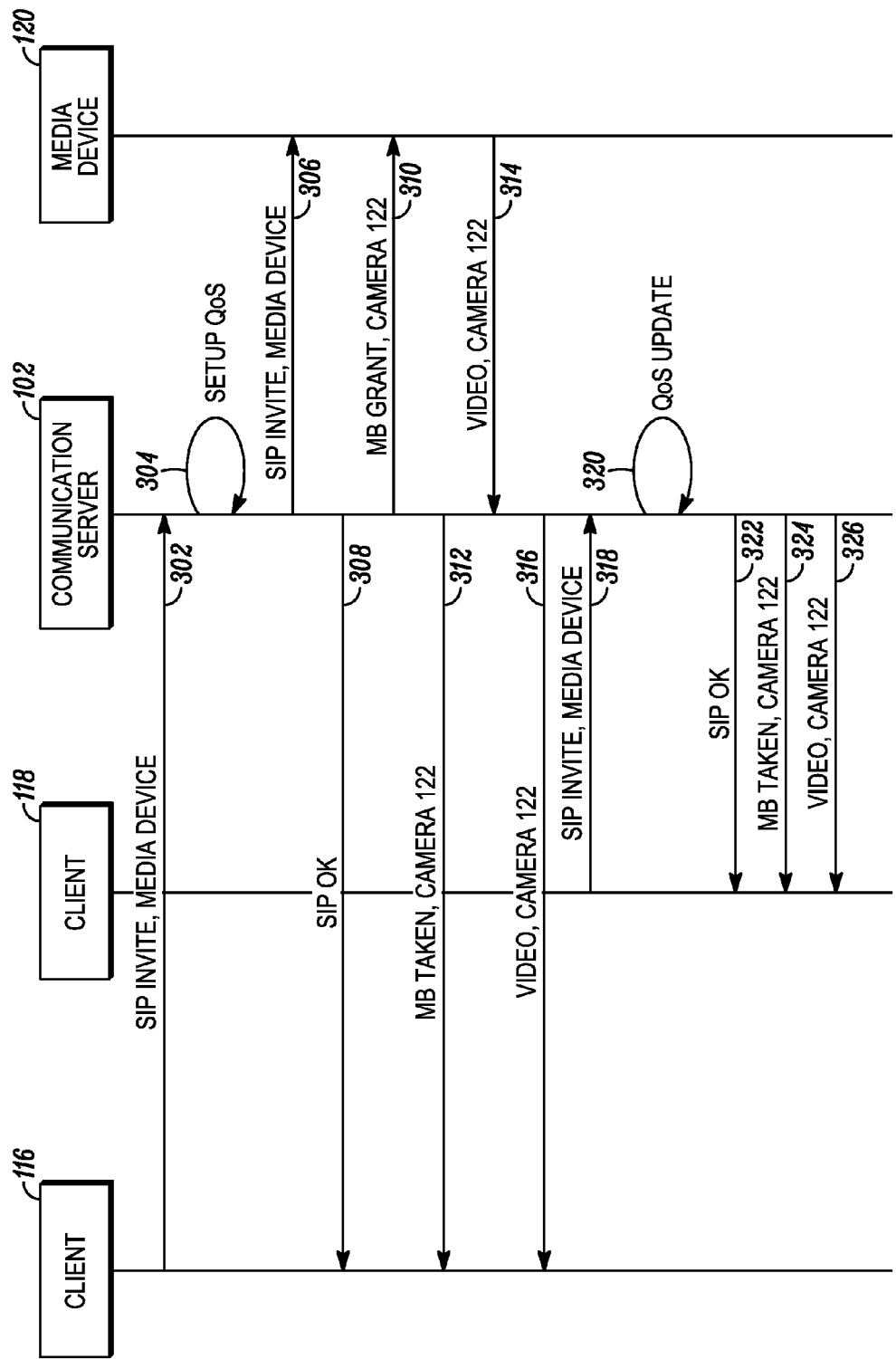
FIG. 3 is a signaling diagram illustrating an implementation of the method shown in FIG. 2, in accordance with an embodiment.
Figure 4:
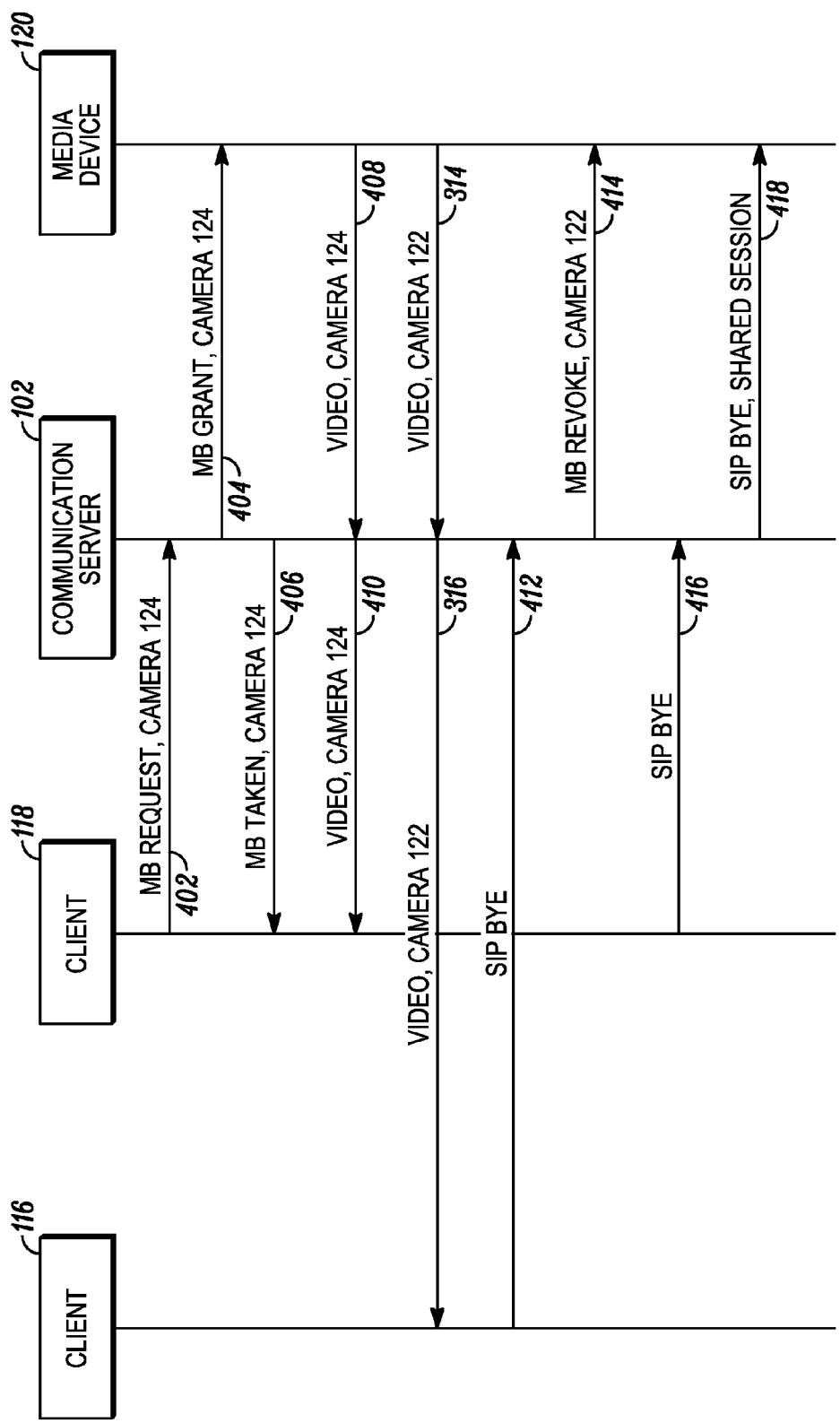
FIG. 4 is a signaling diagram illustrating a further implementation of the method shown in FIG. 2, in accordance with an embodiment.

Turning now to FIG. 2 to FIG. 4. In FIG. 2, a flow diagram for minimizing bandwidth usage between a communication server and a media device in accordance with some embodiments is shown and indicated at 200. A communication server, such as the communication server 102 shown in FIG. 1, performs the steps of method 200. Moreover, with respect to the description herein, the functionality illustrated and described by reference to the flow diagram of FIG. 2 can be performed by means of, for example, a processing device (examples of which are given below) programmed with logic or code to perform its functions, wherein the logic is stored as software and/or firmware in a suitable memory device; and/or a processing device implemented as a state machine or ASIC. FIG. 3 and FIG. 4 show some illustrative signaling between communication server 102, the media device 120 and the clients 116 and 118 in accordance with an embodiment using the SIP and media burst control protocols.

Turning back to method 200 of FIG. 2, two clients (e.g., clients 116 and 118) initiate separate sessions by each client sending a separate request for a session, which is received (202, 204) at the call controller 104. Along with the session request, the communication server further receives separately (202, 204) from each client a request for a media source at a media device. The call controller grants (206) both session requests resulting in separate sessions, respectively, having the client 116 and the client 118 as a participant. It should be noted that the separate sessions can be granted at substantially the same time but in many instances will be granted at different times.

For example, in the OMA PoC implementation shown by reference to FIG. 3, the client 116 sends a SIP INVITE 302 requesting a session that includes the media device 120 as one of the session participants. The SDP in this INVITE describes the video parameters for the media stream with which the user of the client device 116 will view the camera's video. This is standard SIP signaling on the part of the initiating client 116 (with potential extensions to specify a particular camera source associated with an endpoint). The client can, for instance, get the media device and camera information from a directory service.

The SIP INVITE 302 in one implementation includes the following data:

```
INVITE communicationserver102@agency.gov SIP/2.0
To: <sip:communicationserver102@agency.gov>
From: <sip:client116@agency.gov>
Participant List = sip:media_device120@veh1_dvr.agancy.gov
Initial Floor Owner = sip:media_device120@veh1_dvr.agancy.gov;
src=cam122.
```

As can be seen, the SIP INVITE 302 includes an embedded floor request for a particular media source, in this case camera 122, at the media device 120. A floor request, as this term is used herein simply means a request to receive media from a particular media source. In this case, the floor request and session request were included in a single message. However, the floor request can instead be included in a separate message. For instance, the floor request can be included in a message that is sent using the floor control signaling, such as being included in a MB (media burst) REQUEST as described in the OMA PoC standard documents.

The bandwidth manager 106 sets up (304) an initial QoS reservation (also referred to herein as a bandwidth allocation) based on normal session setup procedures, to reserve an amount of bandwidth needed for camera 122 to source its video to the media manager 108 for distribution to client 116. Furthermore, responsive to the SIP INVITE 302 from the client 116, the call controller sends a SIP INVITE 306 to the media device 120, which includes the media device as one of the session participants.

In an implementation in accordance with the teachings herein, the communication server 102 determines that the media device 120 contains multiple cameras and creates a new SDP for the INVITE 306, which includes a separate media stream descriptor for each of the potential media sources. Each media stream descriptor provides the parameters for establishing a separate media stream for each media source at the media device. This is done to easily allow a change of video source without changing the SIP session and to allow sourcing from multiple cameras simultaneously. Alternatively, a re-INVITE could be performed when alternate media sources are needed (although this would necessitate more signaling overhead and may require the QoS to be renegotiated).

To complete the session control signaling between client 116 and the call controller 104, the call controller returns a SIP 200 OK 308 to client 116 which contain a session identifier (e.g., ID x7t928) used to track call signaling related to the session that has just been established with the client 116. In this case, the session that was established was an individual session, but could alternatively have been a group session of which client 116 is a member of the group, but client 318 is not a member of the group. In accordance with conventional SIP signaling (although not shown) client 116 returns a SIP ACK to the call controller 104. Similarly, to complete the session control signaling between the media device 120 and the communication server 102: the media device 120 returns a SIP 200 OK to the communication server 102 (not shown), which is followed by a SIP ACK from the communication server 102 to the media device 120 (not shown).

Based on a floor request embedded in the SIP 302 INVITE, the communication server 102 uses the floor control signaling to send a floor grant message 310, which explicitly grants permission to the media device 120 to source media from the specified media source (here, camera 122) using the media stream parameters provided in the SDP. In this illustrative implementation, a MB GRANT 310 in accordance with the OMA PoC media burst control protocol serves as the floor grant. The communication server 102 also sends a MB TAKEN 312 to the client 116 (also in accordance with the OMA PoC media burst control protocol) to inform client 116 that the media device 120 will be sourcing media from the camera 122 on the media stream that was set up in the SIP INVITE 302. In this example OMA PoC implementation, the MB GRANT and MB TAKEN both contain the media stream descriptor: stream=1; owner=sip: media_device120@veh1_dynagancy.gov; src=cam122. The media device then starts to deliver (212, 314) the video from camera 122 to the media manager 108, which in turn sends it (214, 316) to the receiving client 116 during the established session that has the client 116 as a participant.

Some time later, a user of the client 118 wants to independently view video from a camera at the media device 120. More specifically, the user of client 118 wants to independently view video from the same media source (e.g., camera 122). In this case, neither the client 118 nor its user is aware of the existing session between the client 116 and the media device 120. Accordingly, client 118 sends a separate SIP INVITE 318 requesting an independent session that includes the media device 120 and the client 118 as session participants. The SDP in this INVITE describes the video parameters for the media stream with which the user of the client device 118 will view the camera's video. This is standard SIP signaling on the part of the initiating client 118 (with potential extensions to specify a particular camera source associated with an endpoint). As with the SIP INVITE 302, the session request 318 can be for an individual session or a group session of which client 318 is a member, but client 316 is not a member.

The SIP INVITE 318 in one implementation includes the following data:

```
INVITE communicationserver102@agency.gov SIP/2.0
To: <sip:communicationserver102@agency.gov>
From: <sip:client118@agency.gov>
Participant List = sip:media_device120@veh1_dvr.agancy.gov
Initial Floor Owner = sip:media_device120@veh1_dvr.agancy.gov;
src=cam122.
```

As can be seen, the SIP INVITE 318 also includes an embedded floor request for a particular media source, in this case camera 122, at the media device 120, but the floor request could alternatively have been included in a separate message.

Upon receiving the SIP INVITE 318, the bandwidth manager 106 determines the changes 320 it needs to make to the QoS reservation now that there is an additional session participant. The bandwidth manager determines bandwidth allocation for all of the media sources sharing a common uplink between the media device 120 and the communication server 102 based on two inputs: (1) a maximum bandwidth requirement of any given source stream; and (2) the number of streams which could potentially be sourced simultaneously on this common uplink. The number of potentially simultaneous streams is based on the minimum of: the number of viewers, the number of video sources, and the processing capabilities of the sourcing device. For example, where there are three viewers and six cameras, the bandwidth allocation would be for three streams. Where there are five viewers and two cameras, the bandwidth allocation would be for two streams. Where there are seven viewers and nine cameras, but the media device can only process four streams, the bandwidth allocation would be for four streams.

Tuning back momentarily to method 200 (of FIG. 2), upon receiving the second session request (e.g., the SIP INVITE 318), the call controller determines (208) that the first and second floor requests, respectively, from clients 116 and 118 are for the same media source (e.g., camera 122), and the communication server, thereby, logically links (210), in the communication server 102, the first and second separate sessions (that include the clients as respective participants) to a "shared session" with the media device 120. The logical linking can be performed in a number of ways. First, the call controller 104 can link the separate sessions by assigning each session the same session identifier (e.g., x7t928; wherein clients 116 and 118 are unaware of the common session identifier), and effectively establish the "shared session" (also having the same session identifier) with the media device 120 as a participant by refraining from sending additional session control signaling to the media device 120 in response to SIP INVITE 318, thereby, using the already established session with the media device 120 for controlling all media streams between the media device 120 and the communication server 102. Accordingly, the call controller, simply sends a SIP 200 OK 322 in response to the SIP INVITE 318, and receives back a SIP ACK (not shown).

The logical linking is further performed by the communication server establishing the shared source arbiter 114, which performs floor control signaling in accordance with the teachings herein to cause only a single media stream (which has already been established to service the client 116) to be established to source the media from the camera 122 to the media manager 108 for distribution to both clients 116 and 118; as opposed to establishing two separate media streams between the media device and the communication server to source from the same camera 122, as is done in the prior art. Viewed in another way, as is known in the art, the communication server sets up independent logical floor arbiters 110 and 112 to exchange floor control signaling, respectively, with the clients 116 and 118; and it, thus, appears to the clients 116 and 118 that they are in a private call. However, the difference from the known art is that instead of the separate floor arbiters communicating with the media device 120, which would result in the separate and independent media streams between the communication server and the media device for the same media source, in accordance to the teachings herein, the communication server 102 establishes the shared source arbiter 114 to exchange floor control signaling with the media device 120 to establish the media streams between the communication server 102 and the media device 120. This shared source arbiter 114 maintains the floor state of the media device, which is separate from floor state of the clients (which is tracked by floor arbiters 110 and 112).

Thus, when the shared source arbiter 114 determines that the floor request from client 118 is for a media source in which a media stream is already in place, the shared source arbiter 114 suppresses or determines to withhold sending an additional explicit floor grant (in this case an MB GRANT) that would normally be sent if prior art techniques were used. The floor arbiter 112 simply sends an MB TAKEN 324 to the client 118 to inform client 118 that it can expect media from camera 122 on its stream 1. The MB TAKEN 324 contains the media stream descriptor: stream=1; owner=sip: media_device120@veh1_dynagancy.gov; src=cam122.

The media manager 108 then sends (214, 326) the camera 122 video to client 118 (note that some advanced logic and transcoding could be necessary to match what is being sourced by the media manager 108 to what is being requested by the viewers). In this case, the shared source arbiter 114 is logically linked and interfaces to the floor arbiters 110 and 112 through the assigned common session identifier. However, in an alternate embodiment, the communication server does not require the use of the common or shared session identifier, but instead keeps track internally of the linkage between the floor arbiters 110 and 112, for instance using some sort of table, database, other identifier, other mapping technique, pointer mechanism, etc.

Turning one final time to method 200 shown in FIG. 2, once the shared session is in place, media streams can easily be added and removed (216) using floor control signaling, in accordance with further embodiments of the present teaching. Moreover, the shared session remains in place and is not terminated until all session participants have terminated (218) their independent and separate sessions. Accordingly, as the term is used herein, a "shared session" means a session, with a media device as a participant, that at some point in time was logically linked with multiple independent sessions (individual or group sessions) that were established by multiple clients; wherein this shared session is not terminated until after all session participants (excluding the media device) have left their respective sessions.

FIG. 4 provides illustrative implementations regarding the adding and removing of media streams and the termination of the shared session. Note that not all possible scenarios are shown but only some sample implementation scenarios to aid in the further understanding of the teachings herein. For example, the user of the device 118, at some later time, wants to watch the video from a different media source, e.g., camera 124, at the media device. Floor control signaling is used to do this. Using floor control signaling to switch between different media sources is a much lighter weight method of changing media sources than using RE-INVITES both in terms of the number and size of the messages as well as in terms of setting up QoS.

More particularly, client 118 sends a floor request, e.g., an MB REQUEST 402, to the floor arbiter 112 for camera 124 on its stream 1. The MB REQUEST 402 contains the media stream descriptor: stream=1; owner=sip: media_device120@veh1_dynagancy.gov; src=cam124, and serves as an implicit floor release request for the camera 122 and can also be said to serve as a floor change request from the camera 122 to the camera 124, since the client 118 only established a single media stream for viewing video in the initial SIP INVITE 302. Alternatively, the client 118 could send separate messages to release the floor for camera 122 and then request the floor for camera 124.

The shared source arbiter 114 determines that the media device 120 is not yet sourcing from camera 124 and, therefore, sends a MB GRANT 404 to the media device 120 instructing it to source the video from camera 124 on stream 2 using the parameters that were set up in the SDP of the SIP INVITE 306. The floor arbiter 112 informs the requesting client 118, via a MB TAKEN 406, that the floor change to camera 124 was completed. The MB GRANT 404 contains the media stream descriptor: stream=2; owner=sip: media_device120@veh1_dvr.agency.gov; src=cam124. The MB TAKEN 406 contains the media stream descriptor: stream=1; owner=sip: media_device120@veh1_dynagancy.gov; src=cam124.

Upon receiving the video 408 from the camera 124 on stream 2, the media manager 108 forwards 410 this video to client 118 on its stream 1, in response to the MB REQUEST 402. The shared source arbiter 114 further determines whether any other clients are still receiving media from camera 122. Since the client 116 is still receiving video from camera 122 (e.g., client 116 has not effectively sent a floor release request for camera 122 or a floor change request to a different media source), the media manager 108 also continues to send 316 the video 314 from camera 122 to client 116. However, if client 116 should at this point send the floor arbiter 110 a floor request for camera 124, the media manager would cease forwarding the video from camera 122 and instead forward the video that it is already receiving from camera 124 to the client 116 on its stream 1; in accordance with the teachings herein, a single media stream 2 for the camera 124 has been previously established between the media manager 108 and the media device 120. Moreover, upon determining that no clients are receiving video from camera 122, the shared source arbiter 114 would send a floor release request, e.g., a MB REVOKE, to the media device 120.

At some later time, the user of client 116 decides to no longer view any video from the media device 120. So, the client device 116 sends to the call controller 104 a request to terminate its session with the client device 120. The request to terminate the session, in this case, is an SIP BYE 412 that includes the data:

BYE communicationserver102@agency.gov SIP/2.0
To: <sip:communicationserver102@agency.gov>
From: <sip:client116@agency.gov>
Session ID: x7t928.

In response to the SIP BYE 412, the call controller sends a SIP 200 OK (not shown) to the client 116.

In addition, since the client 116 had been receiving video from camera 122 prior to sending the SIP BYE 412, the request to terminate the session further serves as a floor release request for camera 122 (although an explicit floor release request using floor control signaling could have been sent in addition to the SIP BYE 412). Therefore, in further response to the SIP BYE 412, the shared source arbiter 114 determines whether any other clients are receiving video from camera 122. Since there are no clients receiving video from camera 122, the shared source arbiter 114 sends a floor release request, e.g., a MB REVOKE 414, to the media device 120 informing the media device 120 that it no longer has the floor to send video from camera 122 and to, therefore, stop streaming video from camera 122 on its stream 1.

In further response to the SIP BYE 412, the communication server 102 determines whether any other clients have an active or ongoing session that is logically linked to the shared session with the client device 120. More particularly, in this case the communication server 102 determines whether any clients have an active session having a session identifier of x7t928. Since, client 118 has a session in place having the session identifier x7t928, the shared session is maintained.

Finally, the user of client 118 decides to no longer view any video from the media device 120. So, the client device 118 sends to the call controller 104 a request to terminate its session with the client device 120. The request to terminate the session, in this case, is an SIP BYE 416 that includes the data:

BYE communicationserver102@agency.gov SIP/2.0
To: <sip:communicationserver102@agency.gov>
From: <sip:client118@agency.gov>
Session ID: x7t928.

In response to the SIP BYE 414, the call controller 104 sends a SIP 200 OK (not shown) to the client 116. Also, since there are no other clients that have an active session that is logically linked with the shared session, e.g., that have a session identifier of x7t928, the call controller 104 terminates the shared session with the media device 120 by sending a SIP BYE 418 to the media device 120 and receives in response thereto a SIP 200 OK (not shown).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

It will be appreciated that some embodiments may be comprised of one or more generic or specialized processors (or "processor" or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method of minimizing uplink bandwidth usage from a shared source device described herein. The non-processor circuits may include, but are not limited to, a radio receiver, a radio transmitter, signal drivers, clock circuits, power source circuits, and user input devices. As such, these functions may be interpreted as steps of a method of minimizing uplink bandwidth usage from a shared source device as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for minimizing bandwidth usage between a media device and a communication server in a communication system, the method comprising:
   at the communication server:
      receiving, from a first client, a request to access a first session and a first floor request for a camera at the media device;
      receiving, from a second client, a request to access a second session and a second floor request for the camera;
      granting the requests for the first and second sessions, wherein the first session is separate from the second session;
      determining that the first and second floor requests are for the same camera;
      receiving media from the camera using a single media stream established using floor control signaling;
      in response to the first floor request, delivering the media to the first client during the first session;
      in response to the second floor request, delivering the media to the second client during the second session;
      sending floor control signaling from the communication server to the camera to establish a single media stream from the camera;
      exchanging floor control signaling between the communication server and the first client; and
      exchanging floor control signaling between the communication server and the second client.

2. The method of claim 1, wherein a single message from the first client includes both the request for the first session and the first floor request.

3. The method of claim 1, wherein a single message from the second client includes both the request for the second session and the second floor request.

4. The method of claim 1 further comprising a step of determining to withhold sending another grant to the camera in response to the second floor request as a result of determining that the first and second floor requests are for the same camera.

5. The method of claim 1 further comprising a step of establishing a shared session from the first and the second sessions by assigning a same session identifier to the first and the second sessions.

6. The method of claim 5 further comprising, the communication server:
   receiving a request, from the first client, to terminate the first session;
   receiving a request, from the second client, to terminate the second session; and
   upon determining that no other clients have an active session that is logically linked to the shared session with the media device, terminating the shared session.

7. The method of claim 1 further comprising the communication server determining bandwidth allocation for the camera and at least one other camera that share a common uplink, wherein the bandwidth allocation is determined based at least on: a maximum bandwidth requirement for any of the cameras that share the common uplink; and the number of cameras that share the common uplink.

8. The method of claim 1 further comprising, the communication server:
   receiving, from the first client, a floor release request for the camera;
   determining whether any other clients are receiving the media from the camera; and
   when no other clients are receiving the media from the camera, sending the floor release request to the media device.

9. The method of claim 8, wherein the floor release request comprises a floor request for a second camera at the media device.

10. The method of claim 8, wherein the floor release request comprises a request to terminate the first session.

11. The method of claim 1 further comprising, the communication server:
   determining that the media device includes multiple cameras; and
   sending parameters to the media device for establishing a separate media stream for each camera at the media device.

12. The method of claim 11 further comprising, the communication server:
   receiving a third floor request, from the first client, to access a second different camera at the media device;
   receiving media from the second camera using a single second media stream established using floor control signaling and established using the parameters sent to the media device; and
   sending the media from the second camera to the first client in response to the third floor request.

13. The method of claim 12 further comprising, the communication server:
   receiving a fourth floor request, from the second client, to access the second camera; and in response to the fourth floor request, sending to the second client the media that the communication server received using the second media stream.

14. A communication server for minimizing bandwidth usage between a media device and the communication server in a communication system, the communication server comprising:
- a memory;
- a processor coupled to the memory;
- a call controller that:
  - receives, from a first client, a request for a first session and a first floor request to access a camera at the media device and establishes a first floor arbiter;
  - receives, from a second client, a request for a second session and a second floor request to access the camera, and establishes a second floor arbiter;
  - grants the requests for the first and second sessions, wherein the first session is separate from the second session; and
  - determines that the first and second floor requests are for the same camera and generates a shared arbiter that interfaces between the media device and the first and second floor arbiters;
- the first floor arbiter that exchanges floor control signaling with the first client to respond to the first floor request;
- the second floor arbiter that exchanges floor control signaling with the second client to respond to the second floor request;
- the shared arbiter that exchanges floor control signaling with the media device to cause media to be sent from the camera to the communication server using a single media stream; and
- a media manager that delivers the media to the first client during the first session and delivers the media to the second client during the second session.

15. The communication server of claim 14 further comprising a bandwidth manager that determines bandwidth allocation for the camera and at least one other camera that share a common uplink, wherein the bandwidth allocation is determined based at least on: a maximum bandwidth requirement for any of the cameras that share the common uplink; and the number of cameras that share the common uplink.

* * * * *

UNITED STATES PATENT AND TRADEMARK OFFICE
CERTIFICATE OF CORRECTION

PATENT NO. : 8,296,442 B2  
APPLICATION NO. : 12/621115  
DATED : October 23, 2012  
INVENTOR(S) : Keller et al.

Page 1 of 1

It is certified that error appears in the above-identified patent and that said Letters Patent is hereby corrected as shown below:

On the Title Page, in item (54), and in Column 1, Line 4, Title, delete "AND MEDIA" and insert -- AND A MEDIA --, therefor.

In Column 3, Line 65, delete "OMA-TS-PoC UserPlane-V2_0-20090922-C" and insert -- OMA-TS-PoC_UserPlane-V2_0-20090922-C --, therefor.

In Column 8, Lines 10-11, delete "owner=sip:media_device120@veh1_dynagancy.gov;" and insert -- owner=sip:media_device120@veh1_dvr.agancy.gov; --, therefor.

In Column 9, Lines 60-61, delete "owner=sip:media_device120@veh1_dynagancy.gov;" and insert -- owner=sip:media_device120@veh1_dvr.agancy.gov; --, therefor.

In Column 10, Lines 38-39, delete "owner=sip:media_device120@veh1_dynagancy.gov;" and insert -- owner=sip:media_device120@veh1_dvr.agancy.gov; --, therefor.

In Column 10, Lines 58-59, delete "owner=sip:media_device120@veh1_dynagancy.gov;" and insert -- owner=sip:media_device120@veh1_dvr.agancy.gov; --, therefor.

Signed and Sealed this  
Twelfth Day of February, 2013

Teresa Stanek Rea  
*Acting Director of the United States Patent and Trademark Office*